United States Patent [19]

Baba

[11] Patent Number: 5,742,925
[45] Date of Patent: Apr. 21, 1998

[54] AUTOMOTIVE NAVIGATION SYSTEM

[75] Inventor: Toshiharu Baba, Saitama-ken, Japan

[73] Assignee: Pioneer Electronic Corporation, Tokyo, Japan

[21] Appl. No.: 642,870

[22] Filed: May 6, 1996

[30] Foreign Application Priority Data

May 8, 1995 [JP] Japan ................... 7-109795
May 22, 1995 [JP] Japan ................... 7-122870

[51] Int. Cl.[6] .................................. G06F 165/00
[52] U.S. Cl. .................. 701/221; 701/207; 701/214; 340/988
[58] Field of Search .................. 364/571.01, 571.04; 701/200, 207, 213, 214, 216, 220, 221; 73/178 R; 340/988, 990, 995

[56] References Cited

U.S. PATENT DOCUMENTS

| | | | |
|---|---|---|---|
| 4,924,402 | 5/1990 | Ando et al. | 340/995 |
| 5,115,238 | 5/1992 | Shimizu et al. | 340/988 |
| 5,235,514 | 8/1993 | Matsuzaki | 340/995 |
| 5,270,959 | 12/1993 | Matsuzaki et al. | 364/571.01 |
| 5,278,424 | 1/1994 | Kagawa | 340/995 |
| 5,331,563 | 7/1994 | Masumoto et al. | 340/988 |
| 5,404,307 | 4/1995 | Odagawa | 340/995 |
| 5,424,953 | 6/1995 | Masumoto et al. | 340/988 |

*Primary Examiner*—Gary Chin
*Attorney, Agent, or Firm*—Nikaido Marmelstein Murray & Oram LLP

[57] ABSTRACT

An angular velocity sensor is provided for detecting an angular velocity of a motor vehicle. A right turn and left turn of the motor vehicle are detected. In response to the detected right turn and left turn, positive and negative correction coefficients are obtained. The detected angular velocity is corrected with either of the correction coefficients. A bearing of the motor vehicle is calculated with a corrected angular velocity.

3 Claims, 12 Drawing Sheets

RELATIONSHIP BETWEEN GPS
SPEED AND NUMBER OF PULSES OF VEHICLE SPEED

FIG.13

TRANSITION OF CONSTANT SPEED CONDITION

| n | SELF-CONTAINED NAVIGATION (PULSE N/S) | GPS LOCATION MEASUREMENT (GPS SPEED km/h) |
|---|---|---|
| 1 | ±5 | ±2.5 |
| 2 | ±5 | ±2.45 |
| 3 | ±5 | ±2.4 |
| 4 | ±5 | ±2.35 |
| 5 | ±5 | ±2.30 |
| 6 | ±4.5 | ±2.25 |
| ⋮ | ⋮ | ⋮ |
|  | ±0.5 | ±0.25 |
|  | ±0.5 | ±0.20 |
| ⋮ | ⋮ | ⋮ |
| 50 | ±0 | ±0 |

AUTOMOTIVE NAVIGATION SYSTEM

BACKGROUND OF THE INVENTION

The present invention relates to an automotive navigation system having an angular velocity sensor provided in a vehicle, and more particularly to a correcting system for correcting an angular velocity detected by the sensor.

In order to obtain bearings of a motor vehicle, a conventional automotive navigation system has an angular velocity sensor which detects an angular velocity. The detected angular velocity is obtained by integration calculation of the output of the sensor, thereby obtaining the bearing of the vehicle. However, if the detected angular velocity includes a deviation caused by the sensitivity of the angular velocity sensor, the deviation is also integrated for calculating the bearing. Accordingly, undesirable deviation is gradually accumulated with time. In order to correct the deviation, the angular velocity is corrected after a zero adjustment, thereby eliminating the influence of the sensitivity error of the angular velocity sensor.

Japanese Patent application Laid-Open 4-9710 discloses an automotive navigation system where a Global Positioning System (GPS) as a bearing detecting system is mounted in addition to the angular velocity sensor. The GPS operates to obtain a bearing data, and a bearing obtained by the angular velocity sensor is calibrated by the bearing data of the GPS. Consequently, accumulated deviation in the bearing is eliminated.

Japanese Patent Applications Laid-Open 63-11813 and 63-109315 disclose automotive navigation systems where a bearing obtained by an angular velocity sensor is calibrated in accordance with a bearing stored in a map data which is referred at a cross point on the map. Consequently, accumulated deviation in the bearing is eliminated.

In such an automotive navigation system of a hybrid structure having the GPS in addition to the angular velocity sensor, the GPS is used for calibrating a bearing θ obtained by the angular velocity sensor with a bearing θ' obtained by the GPS. If the GPS is out of work in the case that the vehicle is in a tunnel, or that the vehicle is driven at a low speed at a corner so that the calculation of bearing is too delayed to obtain accurate data, the detected erroneous bearing θ is used as it is. Thus, the system meets both requests of accuracy and continuous operation.

FIG. 7 shows a conventional automotive navigation system. The automotive navigation system comprises a main system 10 as a computer system, a remote controller 20 connected to the main system 10 through a cable, a monitor 40 having a display, a speaker 50, a GPS antenna 60, a gyroscope (gyro) 70 as an angular velocity sensor, and a vehicle speed sensor 80.

The main system 10 comprises a CPU 11, an input circuit 21, a ROM 13, a RAM 14, a CD-ROM controller 31 connected to a CD-ROM driver 30, an image process circuit 41 connected to a dual port RAM 41a, a GPS receiving circuit 61 connected to the GPS antenna 60, an A/D converter 71 connected to the gyro 70, an A/D converter 81 connected to the vehicle speed sensor 80, and a speaker driving circuit 51 connected to the speaker 50. These elements are connected to the CPU 11 through a bus line 12. The image process circuit 41 is connected to the monitor 40.

The ROM 13 has a plurality of programs such as an input process program 22, a monitor display program 42, a vehicle position detecting program 62, a bearing calculating program 72, and a vehicle speed detecting program 82.

The RAM 14 has a plurality of data storage areas 63, 73 and 83, and a map data 33.

The remote controller 20 has a plurality of operation keys corresponding to functions of the system. A desired process is selected by depressing a corresponding key. The remote controller 20 produces a command signal which is applied to the input process program 22 in the ROM 13 through the input circuit 21 for selecting a program stored in the ROM 13. The selected program is processed by the CPU 11.

As a map reading means for reading the map data 33 and storing the read data in the RAM 14, the CD-ROM driver 30 and the CD-ROM controller 31 are operated by a reading program (not shown). A CD-ROM disc having a map data recorded thereon is set in the CD-ROM driver 30 and controlled by the CD-ROM controller 31 for reading the map data.

As a visual display means, the monitor display program 42 operates to convert the map data 33 and the data including a heading direction of the vehicle into picture data, and to store the data in the dual port RAM 41a. The image process circuit 42 is operated to display the stored data on the display of the monitor 40.

In order to indicate acoustic information through the speaker 50, a sound producing program (not shown) operates to apply the data to the speaker driving circuit 51 for producing a sound alarm through the speaker 50.

In order to detect the present location of the vehicle, the GPS antenna 60 is operated by the GPS receiving circuit 61 for receiving waves from a GPS satellite. The position detecting program 62 detects the present location (x, y) of the vehicle based on the received data, and calculates the bearing θ' based on the position of the vehicle. The data of position and bearing are stored in the area 63.

The gyro 70 as the angular velocity sensor has a detecting element comprising a piezoelectric element for detecting an angular velocity which is applied to the A/D converter 71. The A/D converter 71 is a 12-bit converter for converting the detected angular velocity of analog signal into an angular velocity ω1 of digital signal of 0H to 0FFFH. The bearing calculating program 72 operates to calculate the angular velocity ω and the bearing θ which are stored in the data area 73 of the RAM 14.

The vehicle speed sensor 80 detects a vehicle speed V which is applied to the A/D converter 81. A converted signal is operated by the vehicle speed program 82 and stored in the area 83.

Operation for detecting the bearing based on the angular velocity will be described.

The gyro 70 produces the angular velocity of analog signal between 0V and 5V. When the vehicle is stopped, the zero point voltage of the angular velocity is 2.5V.

When the vehicle turns to the right, the bearing of the vehicle changes in the clockwise direction, so that the gyro 70 detects an angular velocity of the positive number and produces a voltage signal between 2.5v and 5V as a deviation voltage.

On the other hand, when the vehicle turns to the left, the bearing of the vehicle changes in the counterclockwise direction, so that the gyro 70 detects an angular velocity of the negative number and produces a voltage signal between 2.5v and 0V as a deviation voltage.

The zero point voltage is drifted by the temperature of the gyro 70. The sensitivity of the gyro, namely deviation of the angular velocity deviated from 2.5V, which is represented by a unit (mv/deg/sec), is regulated in a horizontal state of the gyro and within a predetermined range.

FIG. 8 shows the bearing calculating program 72 processed every 100 ms. The program 72 comprises a subtraction process section 72a applied with the digital signal of the angular velocity ω1 detected by the gyro 70 and converted by the A/D converter 71. The subtraction process section 72a subtracts a zero point angular velocity ω0 which is a value for the zero adjustment from an angular velocity ω1 to obtain an angular velocity ω2 such that the angular velocity of the positive number becomes a positive digital value and the angular velocity of the negative number becomes a negative digital value. The angular velocity ω2 is applied to a multiply process section 72b as a correction section having a correction coefficient G. The correction coefficient G is provided corresponding to the sensitivity of the gyro 70 for reducing the deviation of the bearing caused by the accumulated deviation of the angular velocity as small as possible. The angular velocity ω2 is multiplied by the correction coefficient G to obtain an angular velocity ω. Thus, the deviation of the bearing is precisely and finely adjusted.

The angular velocity ω is applied to a calculation process section 72c, a straight running determining section 72d, and a turning determining section 72h.

In the calculation process section 72c, the angular velocity ω is integrated and added for calculating the bearing θ of the vehicle.

The straight running determining section 72d determines the straight running of the vehicle when the angular velocity ω is less than a predetermined threshold value for a predetermined period or distance. The straight running determining section 72d produces a straight running determined signal which is applied to a zero adjustment section 72e and a bearing calibrating section 72f.

The zero adjustment section 72e which is further applied with the angular velocity ω2 operates to increase or decrease the zero point angular velocity ω0 by 0.01%. Thus, the average of the angular velocity ω2 is adjusted to extremely approach the zero point voltage corresponding to the straight running. Thus, the dynamic drift of the gyro 70 is removed. The adjusted angular velocity ω0 is applied to the subtraction process section 72a.

The bearing calibration section 72f is applied with the vehicle speed V, the bearing θ' and the map data 33. In the straight running of the vehicle, the bearing calibration section 72f applies a calibrating signal to the bearing calculation section 72c for calibrating the bearing θ. The bearing θ is displaced with the bearing θ' when the vehicle runs in straight at vehicle speed V which exceeds a predetermined value, or displaced with the bearing of the map data 33. Thus, the accumulated deviation of the bearing is eliminated.

The calculated bearing θ is applied to a comparing section 72g where the bearing θ is compared with the bearing θ'. The comparison result is applied to a correction coefficient adjustment section 72i.

The turning determining section 72h determines a turning of the vehicle when the absolute value of the angular velocity ω exceeds a predetermined threshold value. A turning determined signal is applied to the correction coefficient adjustment section 72i.

The correction coefficient adjustment section 72i operates to adjust the correction coefficient G by 0.2%, or 0.1% or 0.5% corresponding to the value at the last time in dependency on the comparison result from the comparing section 72g so as to extremely approach the bearing θ to the bearing θ'. The adjustment operation is performed after 4 seconds of the turning determination, namely, the bearing θ has been changed in the significant standard and the bearing θ' is stabilized thereafter. Thus, the influence of the sensitivity of the gyro caused by secular change is eliminated, and the deviation of the angular velocity is more precisely and finely adjusted.

In the process of the program 72, in the straight running, the zero adjustment is performed, thereby eliminating the influence of the dynamic drift of the gyro 70. At turning, the correction coefficient is adjusted to eliminate the influence of the gyro caused by secular change.

The bearing θ' is referred by the monitor display program 42 and sound producing program for indicating information through the monitor 40 and the speaker 50.

In such an automotive navigation system, since the correction coefficient is adjusted in addition to the zero adjustment, the accuracy of the angular velocity ω is ensured over the standard accuracy of the gyro.

However, as aforementioned, there is an essential nature in the self-contained navigation that the bearing is calculated by integrating the angular velocity ω detected by the gyro and if the angular velocity has a deviation, the deviation is accumulated until the bearing is calibrated. Thus, it is required to improve the accuracy of the angular velocity.

Such a process has been done that a trace process is added to the bearing calculating program 72 for tracing the zero point angular velocity ω0, angular velocity ω1, ω2, ω, bearing θ, correction coefficient G, straight running determination, and turning determination, and change and variation are inspected. It has found out that the correction coefficient G changes in cooperation with turning determination, which means there is a regularity in the change of correction coefficient G.

Since the correction coefficient G is dynamically adjusted in order to remove the influence of the sensitivity of the gyro caused by the secular change, the correction coefficient varies under a certain condition corresponding to the condition. Thus, the correction coefficient G regularly changes for cancel the variation.

It is expected that if the condition is defined to process for generating the variation corresponding to the regularity, the correction is further accurate.

SUMMARY OF THE INVENTION

An object of the present invention is to provide an automotive navigation system where an angular velocity detected by an angular velocity sensor is precisely corrected for eliminating the influence of the sensitivity of the sensor, thereby accurately obtaining the bearing of the vehicle.

In order to define a condition when the variation of the correction coefficient having regularity appears, a sensitivity characteristic of the gyro, and a relationship between the variation of sensitivity and the correction coefficient will be described.

FIGS. 3 and 4 are diagrams showing the relationship between the sensitivity variation caused by the sensitivity characteristic of the gyro and the correction coefficient. In FIG. 3, the gyro 70 is mounted in a horizontal disposition. In FIG. 4, the gyro 70 is mounted in an inclined disposition at an angle $\beta$. The angle $\beta$ is exaggerately represented in the figure.

Describing the sensitivity characteristic of the gyro 70, the gyro has a characteristic that if the gyro is inclined at angle $\beta$, the sensitivity is reduced to $\cos\beta$ times compared with that of the gyro in tile horizontal disposition. An optical gyro and gas rate gyro have the same characteristic.

As shown in FIG. 3, if the correction coefficient G corresponding to the horizontal gyro is "1", the correction coefficient G for the inclined gyro is about "1+β" as shown in FIG. 4. Thus, the sensitivity of the gyro which is reduced to cosβ times is canceled by the correction coefficient G which is increased to 1/cosβ times.

Then, in consideration of the correction coefficient G which varies in accordance with the turning determination, inconsistency of rolling characteristic at turning of the vehicle is considered. Namely, in the case a difference of inclination of the vehicle caused by a difference between radius curvatures of right and left turning, or driver's habit, the sensitivity characteristic will be described with reference to FIGS. 5 and 6.

The gyro is horizontally mounted in the vehicle which is running in the horizontal direction. The correction coefficient G is set to a correction coefficient Gr of the positive number at turning to the right, and a correction coefficient Gl of the negative number at turning to the left.

As shown in FIG. 5, when the vehicle is turned to the right, the vehicle is inclined at an angle α, and when the vehicle is turned to the left, the vehicle is inclined at an angle α'. Each of the angles α and α' is exaggerately represented.

At the angle α, the sensitivity is reduced to 1/(1+α) times. Thus, the correction coefficient Gr is increased to (1+α) for canceling the deterioration of the sensitivity. At the angle α', the sensitivity is reduced to 1/(1+α') times. Thus, the correction coefficient Gl is increased to (1+α') for canceling the deterioration of the sensitivity. As a result, a difference ΔG between the positive correction coefficient Gr and the negative correction coefficient Gl becomes about (α−α').

Actually, although the inclinations at angles α and α' are different from each other, the difference therebetween is extremely small.

It will be seen that even if the rolling characteristic is considered at turning on the corners, the variation of the correction coefficient does not appear. The variation of correction coefficient is rarely appears when the vehicle turns repeatedly.

However, even if the gyro is positioned in horizontal, the vehicle may be temporarily inclined for a period in accordance with situations of a passenger and a baggage in the vehicle, and road conditions, and hence the gyro. In this state, if the vehicle is turned on the corner to be inclined, including the rolling characteristic, the variation of the correction coefficient appears.

FIG. 6 is a diagram showing the relationship between the sensitivity variation caused by the sensitivity characteristic of the gyro and the correction coefficient in the above described condition. The gyro is inclined at angle β, and the vehicle is turned on the right at angle α, and turns on the left at angle α'.

In the right turning at angle α, the sensitivity is reduced to cos(β+α) times. Thus, the correction coefficient Gr is increased to (1+β+α) for canceling the deterioration of the sensitivity.

On the other hand, in the left turning at angle α', the sensitivity is only reduced to cos(β−α') times. Thus, the correction coefficient Gl is increased to (1+β−α') for canceling the deterioration of the sensitivity. As a result, since the influences on the correction coefficients Gr and Gl are opposite to each other, a difference ΔG between the correction coefficient Gr and the correction coefficient Gl becomes about (α+α') which is large.

Thus, it is defined that if inclination and rolling of the vehicle are considered, the sensitivity characteristic of the gyro differently affects on the right and left turning.

It is necessary to solve such a defect.

According to the present invention, there is provided an automotive navigation system comprising an angular velocity sensor for detecting an angular velocity of a motor vehicle, first determining means for determining a right turn of the motor vehicle and for producing a right turn signal when determined, second determining means for determining a left turn of the motor vehicle and for producing a left turn signal when determined, first adjusting means responsive to the right turn signal for producing a positive correction coefficient for correcting an angular velocity detected by the angular velocity sensor at the right turn, second adjusting means responsive to the left turn signal for producing a negative correction coefficient for correcting an angular velocity detected by the angular velocity sensor at the left turn, selecting means for selecting either of the positive correction coefficient or the negative correction coefficient, correcting means for correcting the detected angular velocity with a selected correction coefficient, calculator means for calculating a bearing of the motor vehicle with a corrected angular velocity.

These and other objects and features of the present invention will become more apparent from the following detailed description with reference to the accompanying drawings.

BRIEF DESCRIPTION OF DRAWINGS

FIG. 13 is a diagram showing a transition of a condition of a constant speed.

DETAILED DESCRIPTION OF THE PREFERRED EMBODIMENTS

Figure 1:
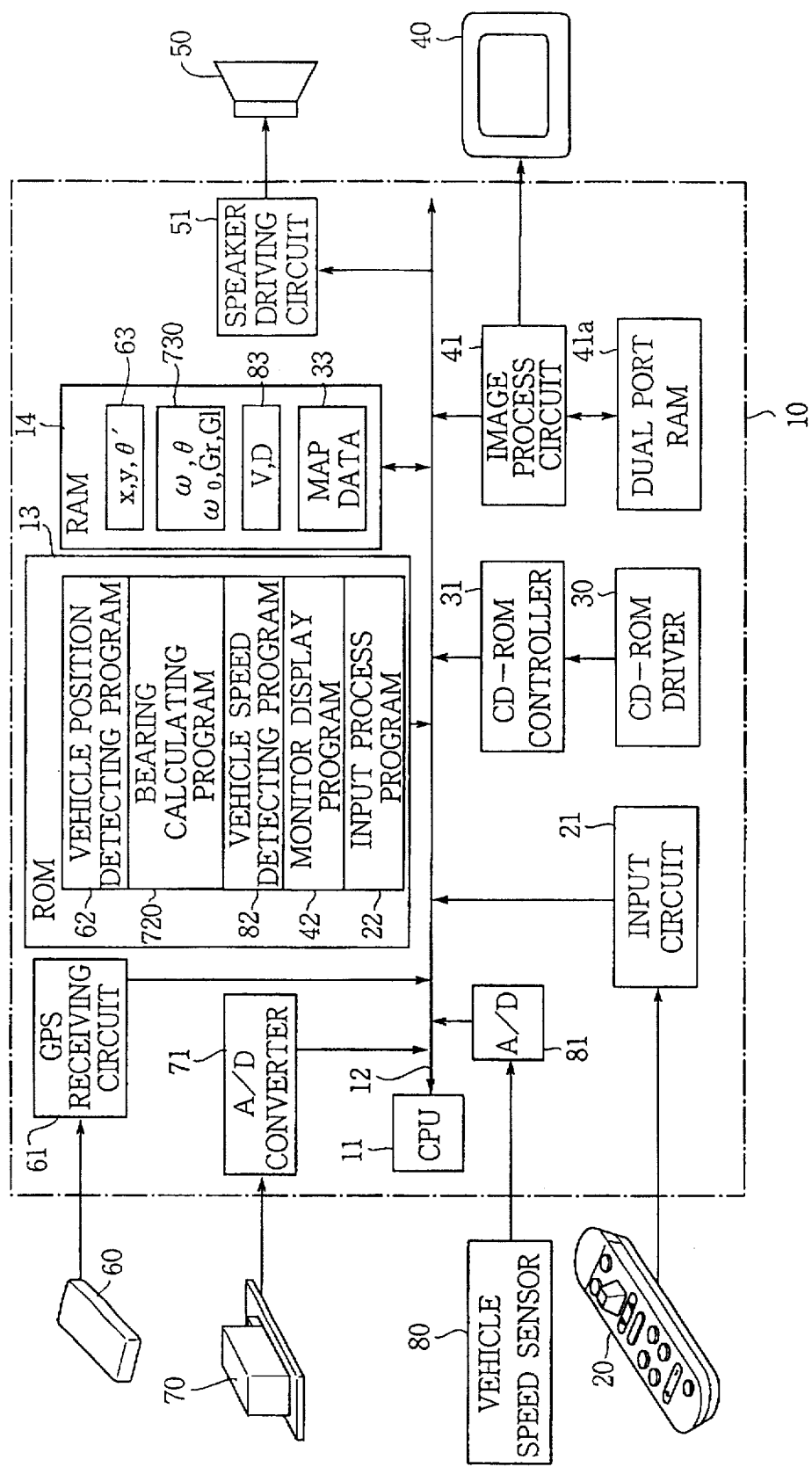
FIG. 1 is a block diagram showing an automotive navigation system mounted in a motor vehicle according to the present invention.
Figure 7:
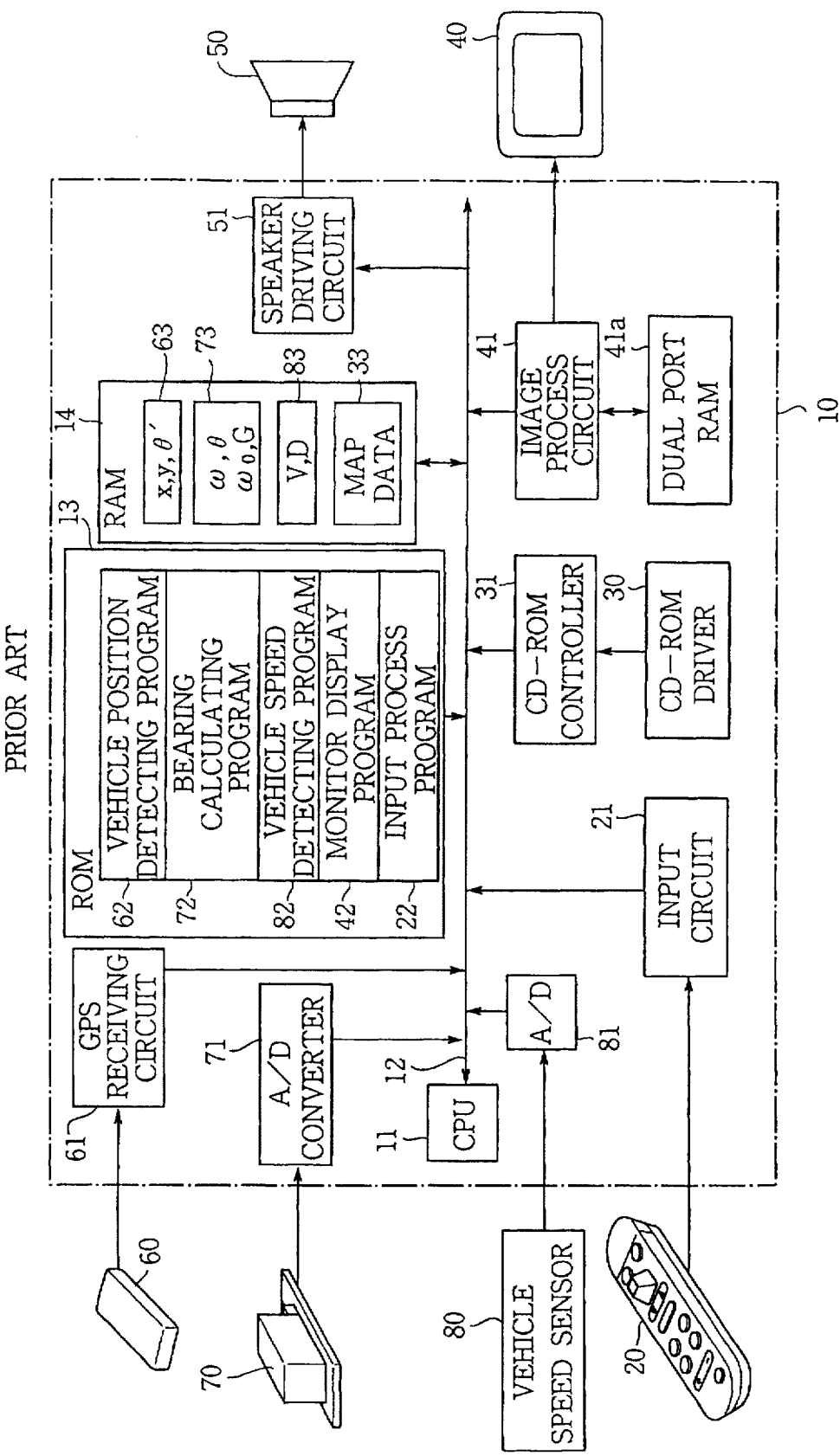
FIG. 7 is a block diagram showing a conventional automotive navigation system.

Referring to FIG. 1 showing an automotive navigation system of the present invention, structures which are the same as the conventional system are identified with the same reference numerals as FIG. 7.

The main system 10 of the automotive navigation system has a bearing calculating program 720 in the ROM 13 in place of the conventional program 72, and hence a data storage area 730 in the RAM 14 in place of the area 73.

In the system, in order to correct the angular velocity, a first correction coefficient Gr of the positive number and a second correction coefficient Gl of the negative number are provided. The first correction coefficient Gr is set corresponding to the sensitivity of the gyro 70 when the vehicle is turned to the right. The second correction coefficient Gl is set corresponding to the sensitivity of the gyro 70 when the vehicle is turned to the left. Thus, one of the correction coefficients is selected in dependency on the heading direction of the vehicle, and the multiply process section 72b (FIG. 2) corrects the angular velocity $\omega$ by the selected correction coefficient.

Figure 2:
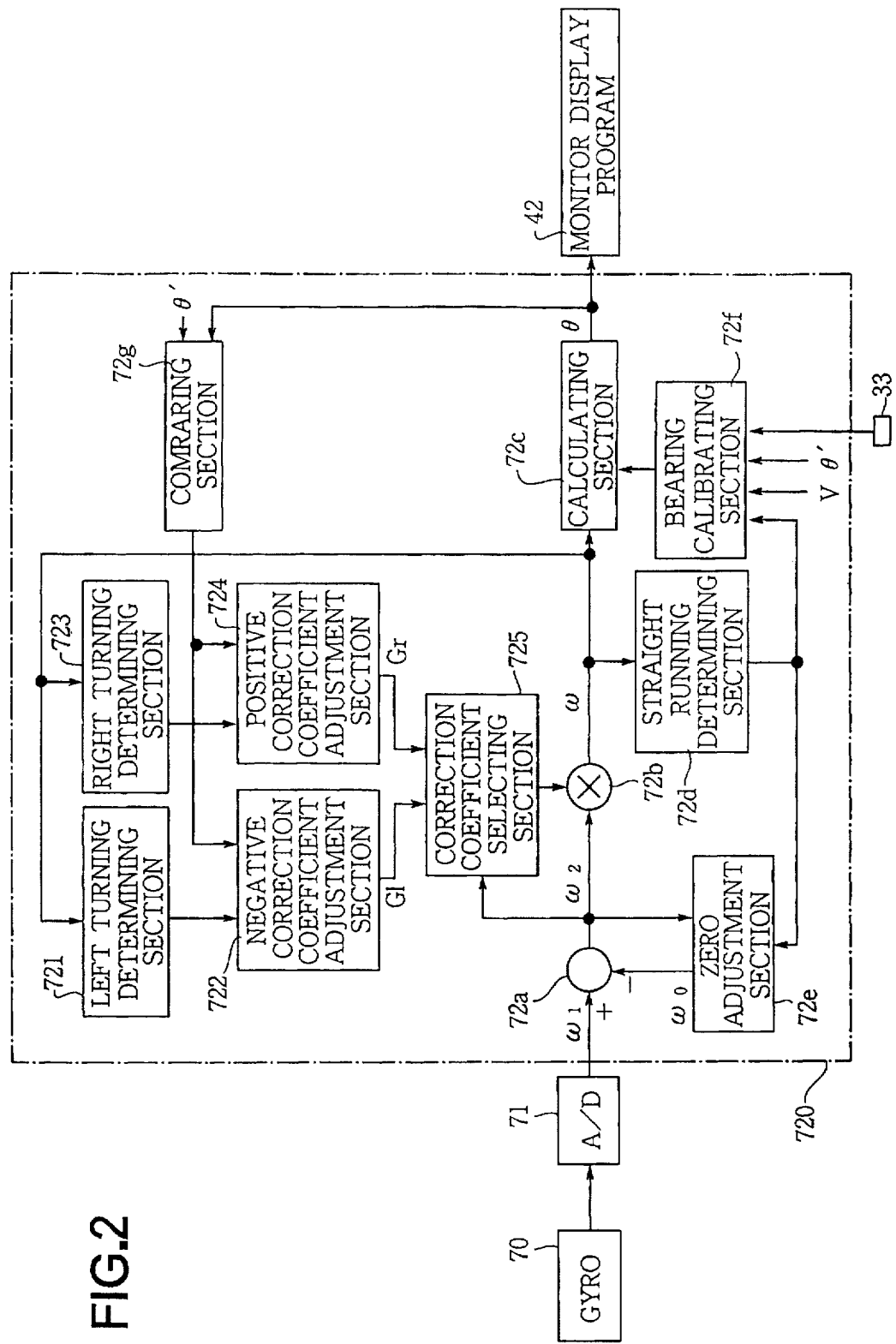
FIG. 2 is a block diagram showing a bearing calculating program of the system.
Figure 3:
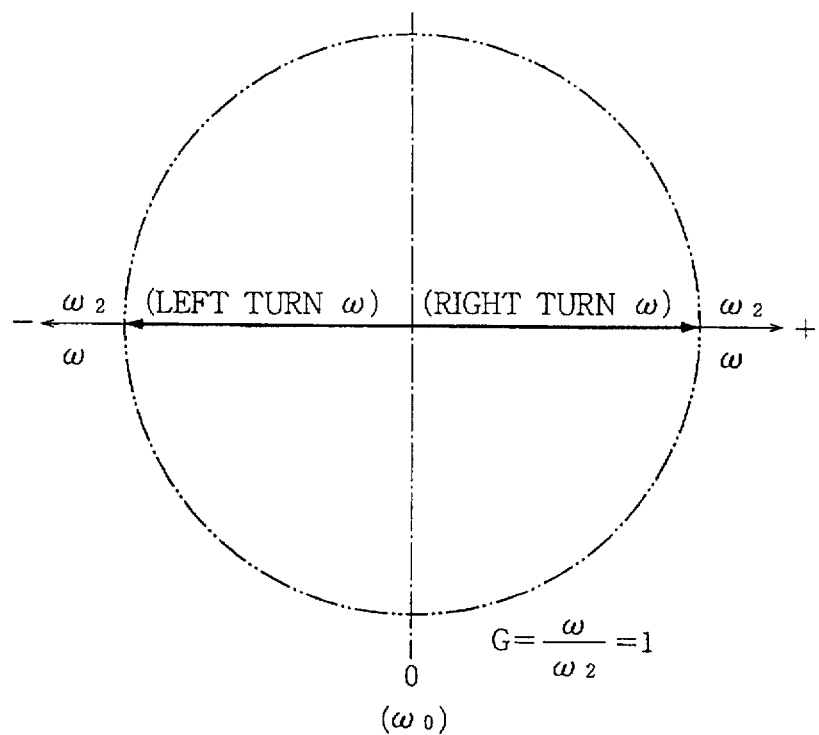
FIG. 3 is a diagram showing a relationship between a sensitivity characteristic of a gyro of the system and a correction coefficient where the gyro is horizontally disposed in the vehicle.
Figure 4:
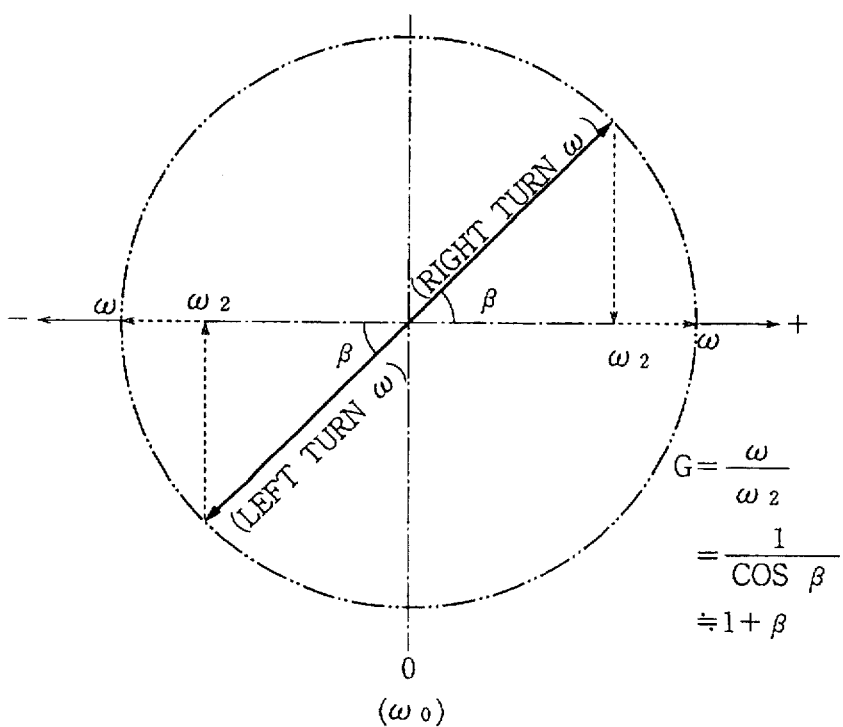
FIG. 4 is a diagram showing a relationship between a sensitivity characteristic of a gyro of the system and a correction coefficient where the gyro is mounted in the vehicle in an inclined disposition.

Referring to FIG. 2, the bearing calculating program 720 comprises a left turning determining section 721 and a right turning determining section 723 in place of the turning determining section, and a negative correction coefficient adjustment section 722 and a positive correction coefficient adjustment section 724 in place of the correction coefficient adjustment section. The program 720 further has a correction coefficient selecting section 725.

Figure 8:
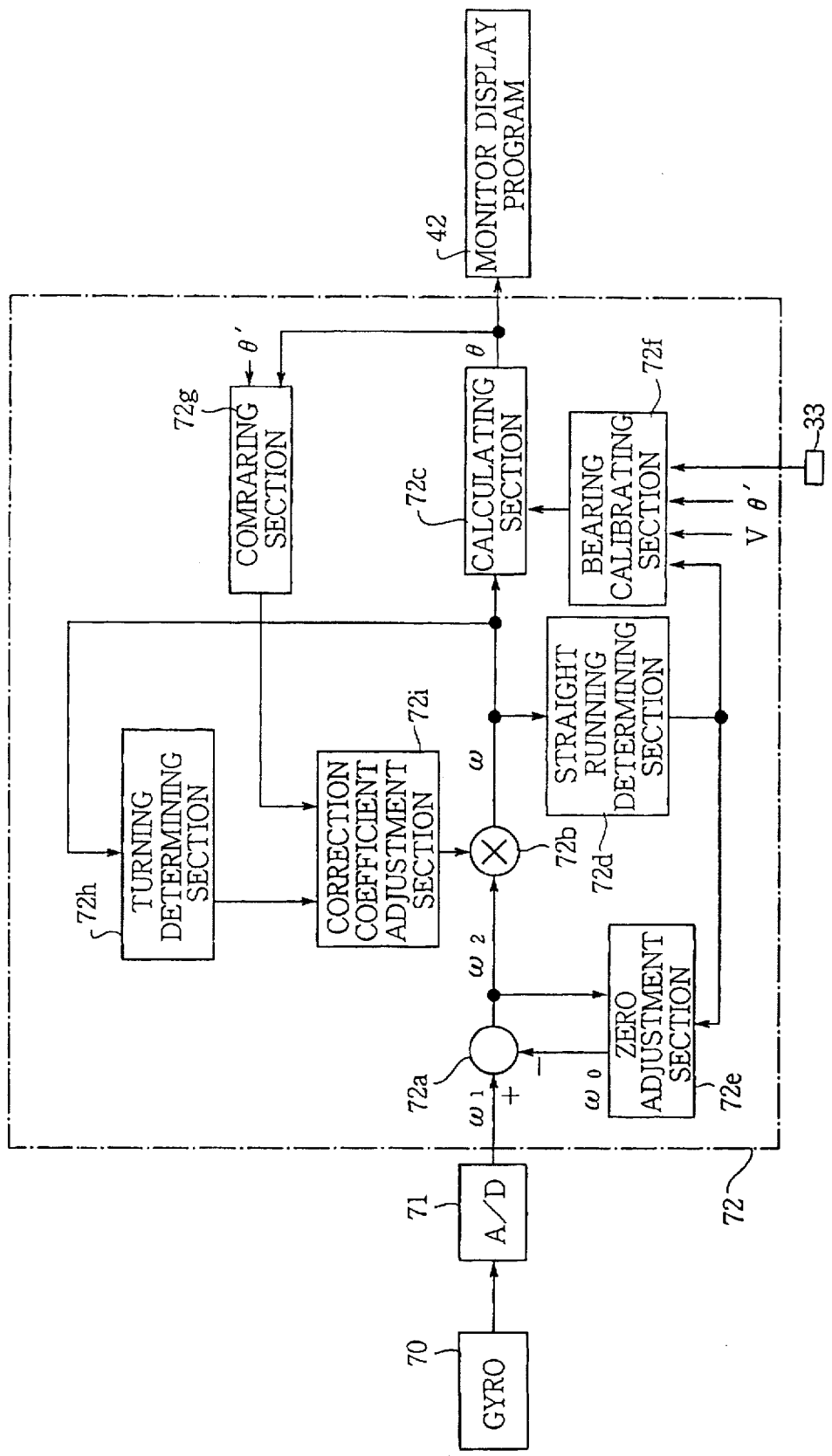
FIG. 8 is a block diagram showing a bearing calculating program of the conventional system.

Other structures are the same as of conventional program and the same parts thereof are identified with the same reference numerals as FIG. 8.

The left turning determining section 721 is applied with the angular velocity $\omega$ and determines a left turning of the vehicle when the angular velocity $\omega$ exceeds a predetermined negative threshold value in a negative side. A left turning determined signal is applied to the negative correction coefficient adjustment section 722.

The negative correction coefficient adjustment section 722 is further applied with the comparison result from the comparing section 72g and operates to adjust the correction coefficient Gl after 4 seconds of the left turning determination. Namely, when the bearing $\theta$ has been changed in and the bearing standard and the bearing $\theta'$ is stabilized thereafter, the correction coefficient Gl is adjusted by 0.2%, or 0.1% or 0.5% corresponding to the value at the last time in dependency on the comparison result from the comparing section 72g so as to extremely approach the bearing $\theta$ to the bearing $\theta'$.

The right turning determining section 723 is applied with the angular velocity $\omega$ and determines a right turning of the vehicle when the angular velocity $\omega$ exceeds a predetermined positive threshold value in a positive side. A right turning determined signal is applied to the positive correction coefficient adjustment section 724.

The positive correction coefficient adjustment section 724 is further applied with the comparison result from the comparing section 72g and operates to adjust the correction coefficient Gr after 4 seconds of the right turning determination. Namely, when the bearing $\theta$ has been changed in the significant standard and the bearing $\theta'$ is stabilized thereafter, the correction coefficient Gr is adjusted by 0.2%, or 0.1% or 0.5% corresponding to the value at the last time in dependency on the comparison result from the comparing section 72g so as to extremely approach the bearing $\theta$ to the bearing $\theta'$.

The correction coefficient selecting section 725 is applied with the correction coefficients Gl and Gr, and the angular velocity $\omega 2$. If the angular velocity $\omega 2$ is negative, the section 725 operates to select the correction coefficient Gl as the correction coefficient of the multiply process section 72b. If the angular velocity $\omega 2$ is positive, the correction coefficient Gr is selected as the correction coefficient of the multiply process section 72b.

Describing the operation, when the vehicle runs in straight, the zero adjustment is performed by the zero adjustment process section 72e. Thus, the influence of the dynamic drift of the gyro 70 is removed, thereby eliminating the accumulated deviation of the bearing $\theta$.

Figure 5:
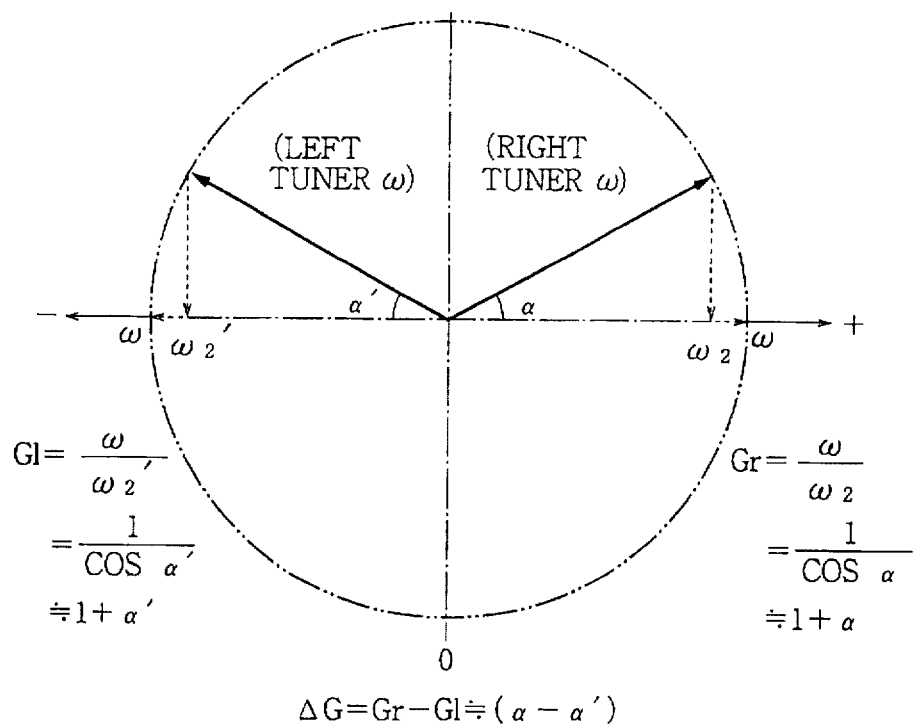
FIG. 5 is a diagram showing a relationship between a sensitivity characteristic of a gyro of the system and a correction coefficient at turning where the gyro is horizontally disposed in the vehicle.
Figure 6:
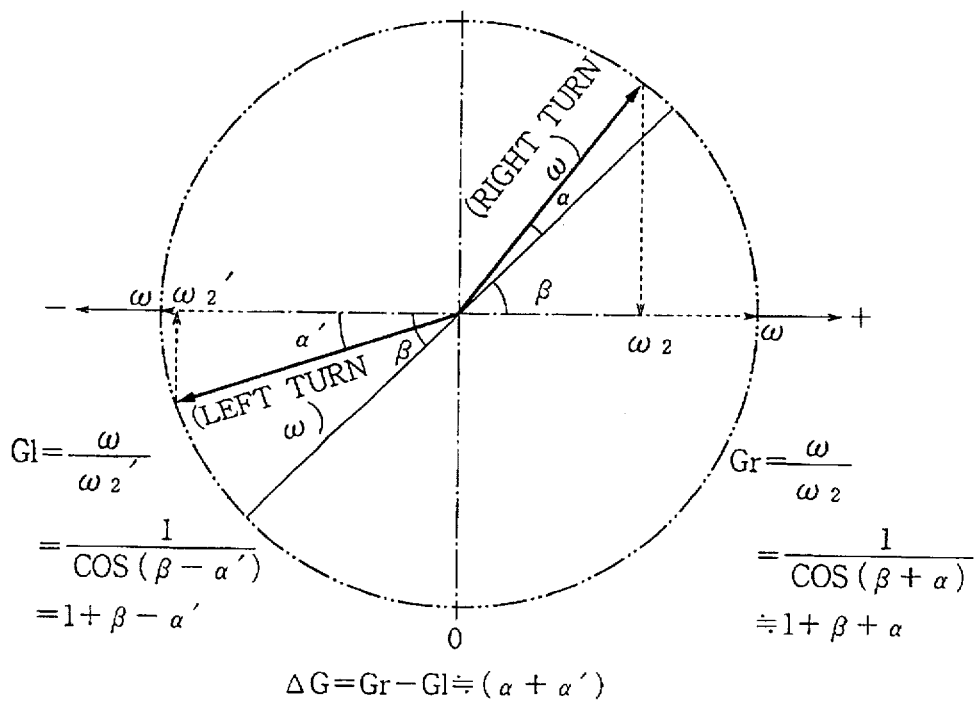
FIG. 6 is a diagram showing a relationship between a sensitivity characteristic of a gyro of the system and a correction coefficient at turning where the gyro is inclined in the vehicle.

The vehicle having the gyro is driven in horizontal state (FIG. 5) or inclined state (FIG. 6) in dependency on the passenger, baggage and road condition.

When the vehicle is turned to the left, the left turning determining section 721 applies a determination signal of a left turning to the negative correction coefficient adjustment section 722. The negative correction coefficient Gl is adjusted so as to approach the bearing $\theta$ to the bearing $\theta'$. The sensitivity of the gyro 70 which is reduced to the $\cos\alpha'$ times or the $\cos(\beta-\alpha')$ times is accurately canceled by the correction coefficient Gl which is adjusted to the $1/\cos\alpha'$ times or the $1/\cos(\beta-\alpha')$ times.

When the vehicle is turned to the right, the right turning determining section 723 applies a determination signal of a right turning to the positive correction coefficient adjustment section 724. The positive correction coefficient Gr is adjusted so as to approach the bearing $\theta$ to the bearing $\theta'$. The sensitivity of the gyro 70 which is reduced to the $\cos\alpha$ times or the $\cos(\beta+\alpha)$ times is accurately canceled by the correction coefficient Gr which is adjusted to the $1/\cos^\alpha$ times or the $1/\cos(\beta+\alpha)$ times.

As a result, it is possible to obtain the angular velocity $\omega$ and the bearing $\theta$ with accuracy for precisely indicating the running situation of the vehicle.

In accordance with the present invention, the first correction coefficient of the positive number and the second correction coefficient of the negative number are provided for correcting the sensitivity of the gyro when the vehicle is turned to the right or the left. The an angular velocity detected by the gyro is precisely corrected, thereby accurately obtaining the bearing of the vehicle.

Figure 9:
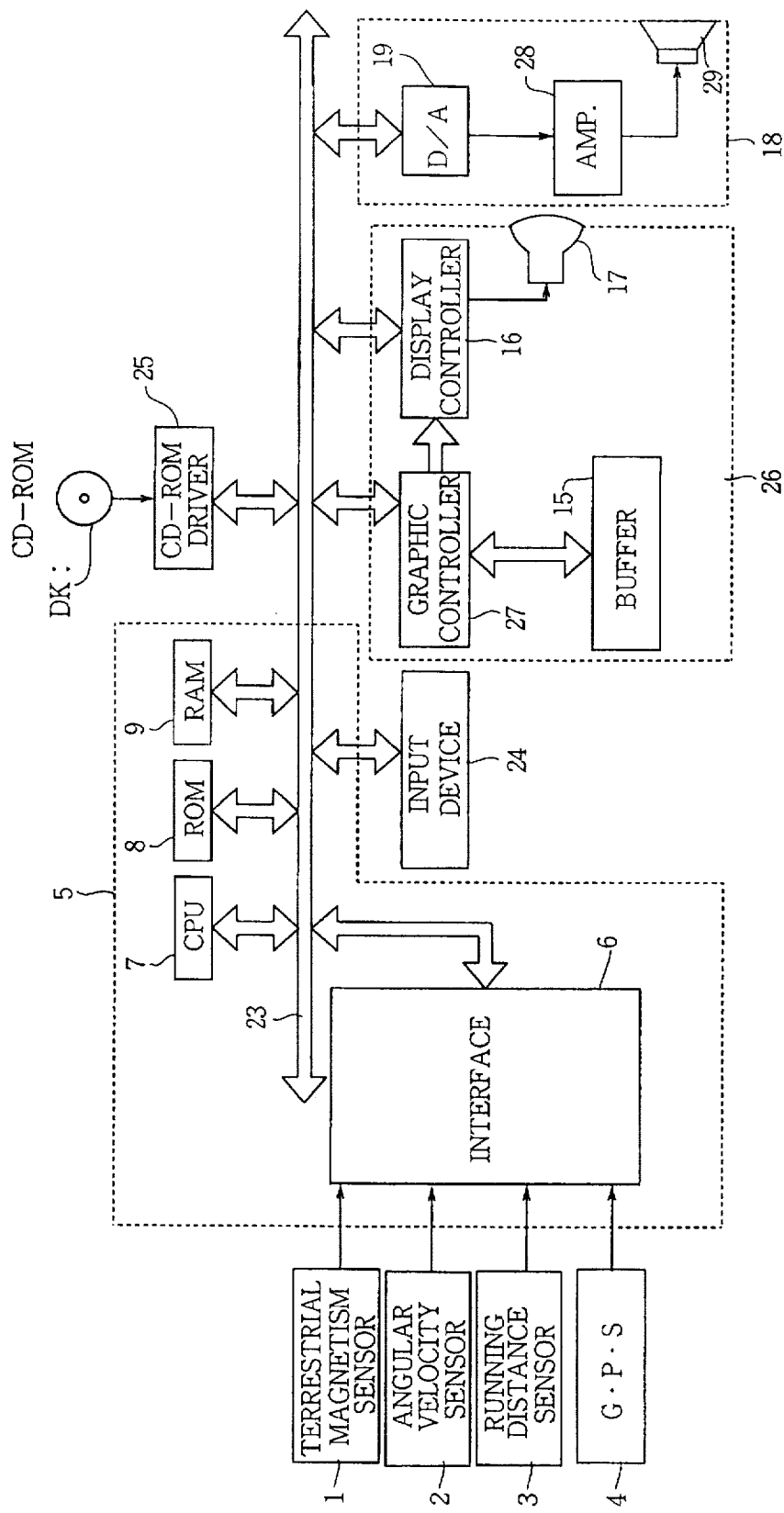
FIG. 9 is a block diagram showing an automotive navigation system of a second embodiment of the present invention.

Referring to FIG. 9 showing an automotive navigation system of a second embodiment, the automotive navigation system has a sensor for detecting a running distance of the vehicle based on the number of pulses of the vehicle speed produced per rotation of the axle of the vehicle.

In order to indicate the present position of the vehicle, the automotive navigation system is employed with a dead reckoning system in addition to the GPS so as to correct the present position.

In the dead reckoning system, a terrestrial magnetism sensor, an angular velocity sensor, and a running distance sensor are provided for detecting information of terrestrial magnetism, direction and running distance, so as to obtain a relative running distance of the vehicle. The relative running distance is added to the initial position for newly determining a present position.

The running distance sensor detects a moving distance of the vehicle based on the running distance per unit of the number of pulses corresponding to the various types of the vehicles.

Japanese Patent Application No. 3-829 discloses a system where the number of pulses per rotation of the axle which corresponds to the type of the vehicle is input by operating an input device. A running distance per unit is calculated every one pulse based on the number of pulses per rotation of the axle. The running distance is measured based on the calculated running distance per unit and the total number of the rotation of the axle. Accordingly, there is no deviation of the measurement of the running distance caused by the difference of types of the vehicles.

Furthermore, it is necessary to finely adjust the running distance per unit number of pulses detected by the running distance sensor in dependency on road conditions such as paved road, gravel road and snowy road.

Japanese Patent Application Laid-Open No. 4-315914 discloses a system where a correction coefficient of the distance is updated in order to correct a deviation between the actual running distance and the measured running distance. In the system, the correction coefficient is updated as the vehicle turns on a corner.

However, in the former system, since it is necessary for the user to investigate the type of the vehicle to input the number of pulses, it is troublesome for the user. Furthermore, if the number of pulses is erroneously input, the system is not normally operated.

In the latter system, unless the vehicle turns on the corner, the correction coefficient is not adjusted. Therefore, if the vehicle runs the straight road such as a high way, the correction coefficient is not updated for a long time.

In order to solve these problems, a moving speed calculated based on the GPS may be used. However, the GPS and the dead reckoning system are an independent system, so that a time for calculating the moving speed in the GPS is difference from a time for detecting the number of pulses of the vehicle speed in the dead reckoning system. Thus, timings for obtaining detected outputs are deviated.

Figure 12:
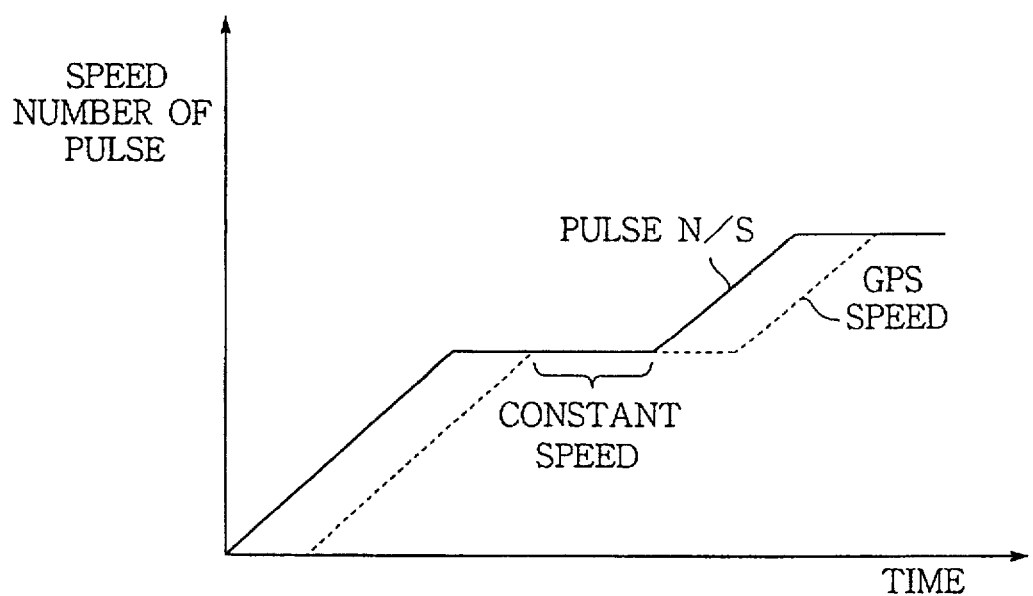
FIG. 12 is a diagram showing a relationship between a GPS speed and the number of pulses of a vehicle speed.

FIG. 12 shows a relationship between the number of pulses and a GPS speed per unit time. From the foregoing, it will be seen that a sampling timing and a time necessary for calculation affect the outputs of the GPS speed and the number of pulses, so that a predetermined time lug produces.

An object of the second embodiment is to provide a system where the detection of the running distance and the update of the correction coefficient are accurately performed at a high speed.

As shown in FIG. 9, the automotive navigation system comprises a system controller 5, an input device 24 for applying data to the system controller 5, a display unit 26 for displaying indication information, a sound reproducing unit 18 for reproducing acoustic information, and a CD-ROM driver 25. These elements are connected to each other through a bus line 23.

The automotive navigation system further comprises a terrestrial magnetism sensor 1 for detecting a running direction of the vehicle, an angular velocity sensor 2 for detecting an angular velocity, a running distance sensor 3 for detecting a pulse of a vehicle speed produced corresponding to a rotation of an axle of the vehicle, and a GPS 4 for detecting a present position of the vehicle.

The system controller 5 comprises an interface 6 to which output signals of the sensors 1, 2 and 3 and the GPS 4 are applied, a CPU 7 for controlling the system controller, a ROM 8 for storing control programs, and a RAM 9 for storing temporary data. The system controller 5 controls each element of the automotive navigation system based on direction data, angular velocity data, running distance data, and position data.

The CD-ROM driver 25 reads a data recorded on a CD-ROM disc DK.

The display unit 26 comprises a graphic controller 27 for controlling the display unit based on a control data applied from the CPU 7 of the system controller 5 through the bus line 23, a buffer 15 having memories such as a VRAM (Video RAM) for temporarily storing image data to be displayed, and a display controller 16 for controlling a display 17 comprising a liquid crystal display device or a CRT.

The sound reproducing unit 18 comprises a D/A converter 19 for converting audio digital data applied from the CD-ROM driver 25 or the RAM 9 through the bus line 23 into an audio analog signal, an amplifier 28 for amplifying the analog signal applied from the D/A converter, and a speaker 29 for converting the amplified audio analog signal into an audio vibration and producing sounds.

The operation will be described with reference to flowcharts of FIGS. 10 and 11, which comprise a rough adjustment and a fine adjustment.

In the rough adjustment, the running distance per unit of the number of pulses is obtained based on the comparison of the moving speed and the number of pulses when the vehicle is traveled at a predetermined constant speed. Thus, the time lug does not affect the calculation.

In the fine adjustment, since the running distance per unit number of pulses slightly varies in accordance with road conditions, a correction coefficient is calculated for correcting the running distance.

Figure 10:
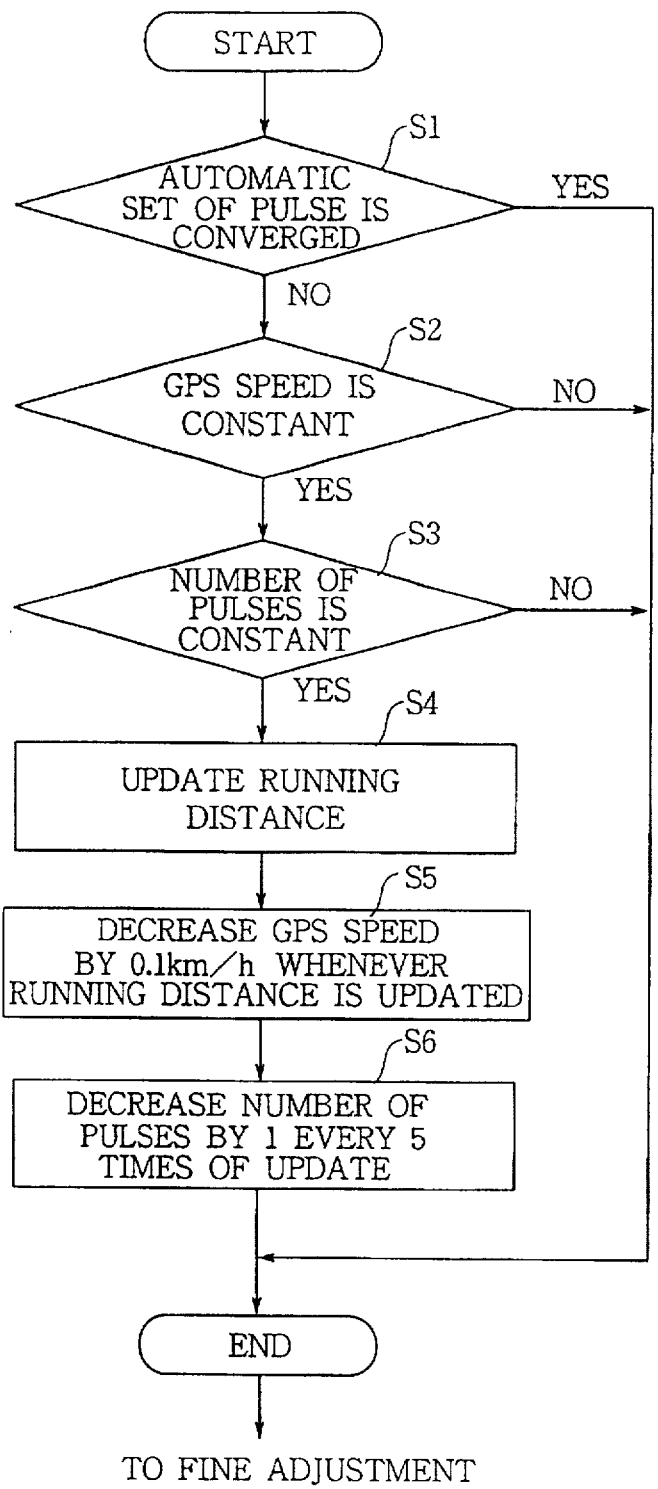
FIG. 10 is a flowchart showing an operation of the system.

FIG. 10 shows the rough adjustment operation. When the condition of the constant speed is met, the running distance per unit number of pulses is updated. At that time, a deviation for regulating the accuracy of the condition of the constant speed is reduced.

At a step S1, it is determined whether a rough adjustment has been already completed or not. If yes, the program goes to the program of the fine adjustment. If not, the program goes to a step S2.

At the step S2, a moving speed (hereinafter called GPS speed) is calculated in the CPU 7 based on the present point detected by the GPS 4 and the relative speed (Doppler effect) of the satellite. When the GPS speed is continuously measured at predetermined times (m times), the GPS speed is detected whether it is within a predetermined deviation range (±2.5 km/h) so that the vehicle is traveled at a stable constant speed or not.

For example, the GPS speed is detected four times and the detected data are stored in the buffer. Two of them are compared to obtain a difference therebetween. If all of the differences are within the set deviation, the constant speed is determined.

If yes, the program goes to a step S3. If not, the program is terminated.

At the step S3, it is determined whether the number of pulses per unit time which is periodically detected by the running distance sensor 3 is within a predetermined deviation range (for example ±5 pulse/sec) so that the vehicle is driven at a stable constant speed or not. The determination is obtained in the same manner as that of the step S2.

If yes, it is determined that the time lug is eliminated which is shown by a constant speed area in FIG. 12, and the program goes to a step S4. If not, the program is terminated.

At the step S4, the running distance per one pulse is updated by the CPU 7 based on the GPS speed and the number of pulses. For example, the running distance D per unit of the number of pulses updates at n times is calculated based on an equation (1).

The running distance per pulse is $$D(n)=K(V1+Vs+\ldots+Vm)/(P1+P2+\ldots+Pm) \quad (1)$$

where K is a calculating coefficient of a unit.

At K step S5, in order to heighten the accuracy of the measured running distance, a condition for calculating the running distance of the next time is changed in order. Namely, whenever the running distance is updated, the deviation range as the constant speed condition of the GPS speed is reduced by a predetermined value (for example, 0.1 km/h).

At a step S6, the deviation range of the number of pulses per unit time is reduced by a predetermined number (for example, 1 pulse).

FIG. 13 shows a relationship between the deviation range and the time n. As the running distance is updated, the constant speed condition is strict, thereby heightening the accuracy. A running distance D(n) obtained when the constant speed conditions of the both systems becomes zero is a final convergence value Do in the rough adjustment.

If the running distance is obtained with a high accuracy at the beginning, it takes a long time to completely calculate the running distance. Accordingly, the running distance detected by the running distance sensor can not be used during the calculation.

In the operation, the accuracy of the running distance is gradually increased. Thus, the running distance D(n) during the calculation can be used, although the calculation is not completed.

Thereafter, the number of pulses and the GPS speed are accumulated to perform the fine adjustment for obtaining a difference produced corresponding to the running distance as a correction coefficient.

In the rough adjustment, the number of pulses at per rotation of the axle is obtained in accordance with the running distance Do.

The constant speed condition is used in the fine adjustment as well as the rough adjustment. As examples of a vehicle having a different number of pulse, a vehicle having an axle of 10 pulses and a vehicle having an axle of 20 pulses will be described. In a vehicle having the axle of 10 pulses, the constant speed condition is ±1 pulse/sec of the number of pulses, and ±0.5 km/h of the GPS speed. In a vehicle having an axle of 20 pulses, ±2 pulse/sec, of the number of pulses, and ±0.5 km/h of the GPS speed. The deviation of the pulse is equal (10%).

Figure 11:
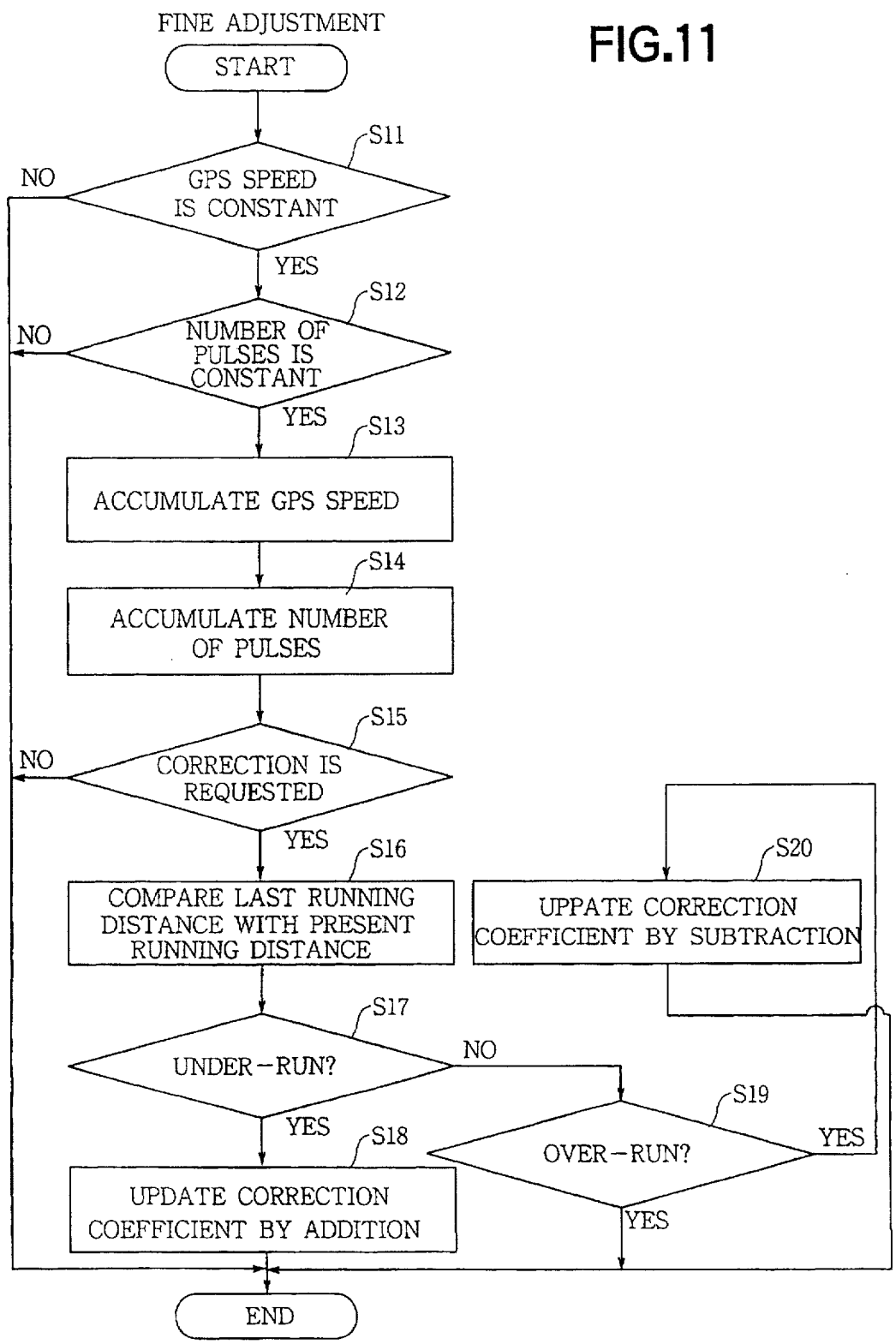
FIG. 11 is a flowchart showing a further operation of the system.

FIG. 11 shows the fine adjustment operation.

At steps S11 and S12, the GPS speed and the number of pulses are determined to be met to the constant speed conditions in the same manner as the steps S2 and S3 of the rough adjustment.

If yes, the GPS speed is accumulated at a step S13, and the number of pulses is accumulated at a step S14. These accumulated data are stored in the RAM 9.

At a step S15, the number of data stored in the buffer is detected to be exceeded a predetermined number (for example, 10000h: h is a hexadecimal number). If yes, it means that the running distance is requested to correct.

At a step S16, the CPU 7 calculates a running distance D' per unit of the number of pulses based on the accumulated GPS speed and the number of pulses of the vehicle speed by an equation (2).

The running distance D' per unit number of pulses is $$D'=K' \text{ accumulated GPS speed/accumulated number of pulses} \quad (2)$$

At a step S16, a distance correction coefficient R is updated.

Namely, after the data which exceed a predetermined amount is accumulated, the correction coefficient R is updated as the constant speed conditions are determined at steps S11 and S12. Here, the running distance used for actually calculating the running distance is assumed to Dc, the running distance Dc after correction is $$Dc=R \times Do.$$

where an initial value of the correction coefficient R is 1.0.

The correction coefficient R is updated by comparing the running distance Dc which is actually used with the running distance D' per unit number of pulses obtained at the step S16.

At a step S17, if Dc<D', the program goes to a step S18 where the correction coefficient R is increased by adding a correcting value. As the correcting value, ±0.001 (±0.1%), ±0.0005 (±0.05%), or ±0.00025 (±0.025%) are selected.

Figure 14:
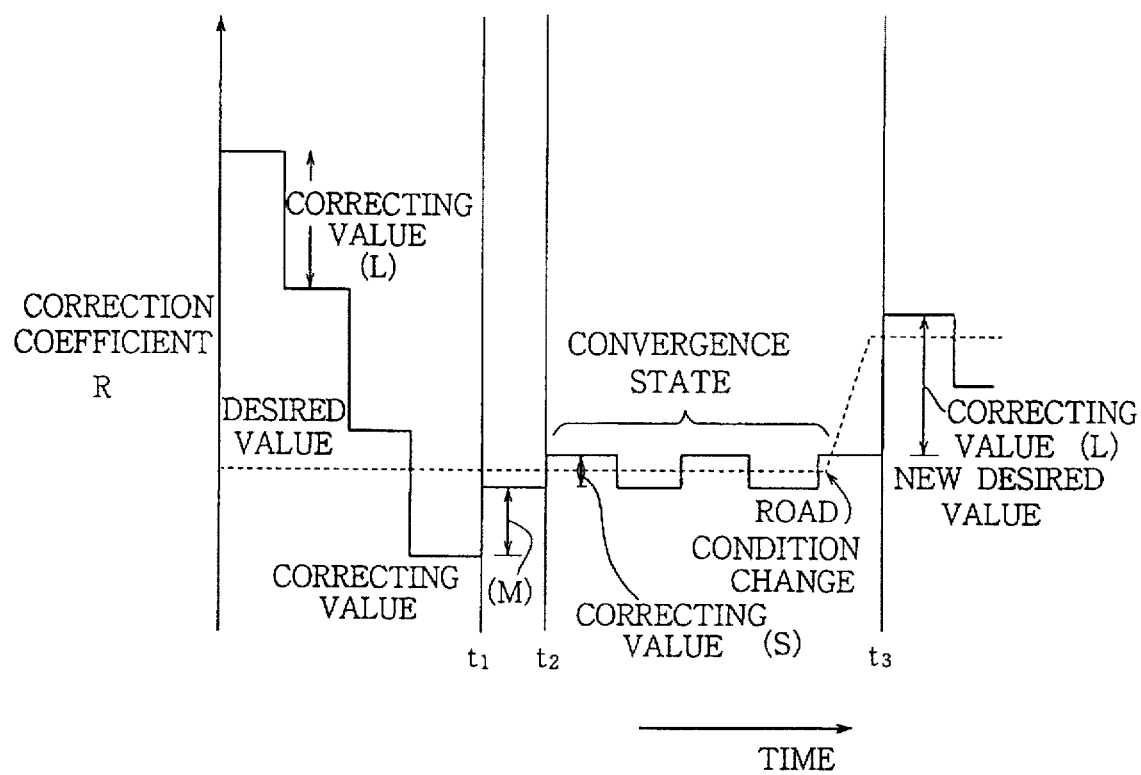
FIG. 14 is a diagram showing a convergence of a correction coefficient.

FIG. 14 shows the correcting value. In order to change the correcting value, first, the variation of the correction coefficient R is observed in the largest correcting value. When the correction coefficient varies in an inverse direction at a time t1, a smaller correcting value is set. In the smallest correcting value, the correction coefficient R is converged at a time t2 where the correction coefficient with the highest accuracy is obtained which meets the actual road conditions.

In an ideal convergence of the correction coefficient R, the correction coefficient R varies in the positive and negative directions in the center of a value which is finally converged. The CPU 7 inspects the direction of variation of the correction coefficient R. When the variation of the correction coefficient R is monotonously increased or decreased at a time t3, it is determined that the road conditions change. Then, the largest correcting value is again selected to converge the correction coefficient R.

At a step S19, if Dc>D', the program goes to a step S20 where the correction coefficient R is decreased by subtracting the correcting value.

If Dc=D', the correction coefficient R is not updated.

In accordance with the present invention, the rough adjustment and the fine adjustment are performed in order. In the rough adjustment, since the running distance is calculated at a high speed, the user can obtain the running distance for a short time. For example, in the conventional system, it takes about 15 to 25 minutes for calculating the running distance. In the present embodiment, it is possible to indicate a first running distance for ten and a few seconds. In the fine adjustment, the change of the running distance D' per pulse in dependency on conditions is converged with a high accuracy.

As a modification, only one of the rough and fine adjustments is performed. As another modification, the deviation for regulating the constant speed condition and the value for calculating the correction coefficient are selected by the other values. If the condition of the standard speed is strict, it takes time for calculating the running distance. However, the accuracy of the running distance is improved.

In accordance with the present invention, the running distance is detected with high accuracy at a high speed.

It is possible to remove the time lug affected on the necessary measuring times of a plurality of systems. It is possible to maintain the high accuracy of the running distance corresponding to the road conditions.

While the invention has been described in conjunction with preferred specific embodiment thereof, it will be understood that this description is intended to illustrate and not limit the scope of the invention, which is defined by the following claims.

What is claimed is:

1. An automotive navigation system comprising:

an angular velocity sensor for detecting an angular velocity of a motor vehicle;

first determining means for determining a right turn of the motor vehicle and for producing a right turn signal when determined;

second determining means for determining a left turn of the motor vehicle and for producing a left turn signal when determined;

first adjusting means responsive to the right turn signal for producing a positive correction coefficient for correcting the angular velocity detected by the angular velocity sensor at the right turn;

second adjusting means responsive to the left turn signal for producing a negative correction coefficient for correcting the angular velocity detected by the angular velocity sensor at the left turn;

selecting means for selecting either of the positive correction coefficient or the negative correction coefficient;

correcting means for correcting the detected angular velocity with the selected correction coefficient;

calculator means for calculating a bearing of the motor vehicle with the corrected angular velocity.

2. An automotive navigation system comprising:

an angular velocity sensor for detecting an angular velocity of a motor vehicle;

first determining means for determining a right turn of the motor vehicle and for producing a right turn signal when determined;

second determining means for determining a left turn of the motor vehicle and for producing a left turn signal when determined;

first adjusting means responsive to the right turn signal for producing a positive correction coefficient for correcting the angular velocity detected by the angular velocity sensor at the right turn;

second adjusting means responsive to the left turn signal for producing a negative correction coefficient for correcting the angular velocity detected by the angular velocity sensor at the left turn;

first correcting means for correcting the detected angular velocity with the positive correction coefficient;

second correcting means for correcting the detected angular velocity with the negative correction coefficient;

selecting means for selecting either of the corrected angular velocity with the positive correction coefficient or the negative correction coefficient in accordance with a bearing of the motor vehicle;

calculator means for calculating the bearing of the motor vehicle with the selected corrected angular velocity.

3. The system according to claim 1 further comprising a GPS for obtaining bearings data, comparator means for comparing the bearing calculated by the calculator means with the bearing data, means for adjusting either of the positive correction coefficient or the negative correction coefficient with a result of the comparison.

* * * * *